United States Patent [19]

Garcia et al.

[11] Patent Number: 5,565,503
[45] Date of Patent: Oct. 15, 1996

[54] CHEMICALLY DEGRADABLE POLYOLEFIN FILMS

[75] Inventors: Rodrigo A. Garcia, Conroe, Tex.; Joseph G. Gho, Vancouver, Canada

[73] Assignee: EPI Environmental Products Inc., Conroe, Tex.

[21] Appl. No.: 374,114

[22] Filed: Jan. 18, 1995

Related U.S. Application Data

[63] Continuation of Ser. No. 104,195, Aug. 10, 1993, Pat. No. 5,416,133, which is a continuation-in-part of Ser. No. 933,685, Aug. 24, 1992, abandoned.

[51] Int. Cl.$^6$ .................... C08K 3/00; C08J 7/12
[52] U.S. Cl. .............. 523/124; 523/125; 523/128; 524/425; 264/564; 264/566
[58] Field of Search ................... 523/124, 125, 523/128; 524/425; 264/564, 566

[56] References Cited

U.S. PATENT DOCUMENTS

| | | | |
|---|---|---|---|
| 4,094,854 | 6/1978 | Harada et al. | 260/42.46 |
| 4,101,720 | 7/1978 | Taylor et al. | 526/3 |
| 4,156,666 | 5/1979 | Odate et al. | 260/23 |
| 4,256,851 | 3/1981 | Taylor et al. | 525/1 |
| 4,517,318 | 5/1985 | Miyoshi et al. | 523/126 |
| 5,009,809 | 3/1991 | Rosin et al. | 252/350 |
| 5,009,810 | 3/1991 | Wason et al. | 252/350 |
| 5,045,570 | 8/1991 | Mooney et al. | 521/88 |
| 5,096,940 | 3/1992 | Mor | 524/376 |
| 5,106,534 | 4/1992 | Wason et al. | 252/350 |
| 5,258,422 | 11/1993 | Chang et al. | 523/124 |

OTHER PUBLICATIONS

Garbage, May/Jun. 1990, "Degradable Plastics", John Donnelly, pp. 42–45.
Degradable Materials : Perspectives, Issues & Opportunities "Introduction", Ramani Narayan, pp. 1–10.

*Primary Examiner*—Paul R. Michl
*Assistant Examiner*—Olga Asinovsky
*Attorney, Agent, or Firm*—Mary J. Gaskin

[57] ABSTRACT

The present invention is directed to melt blown polyolefin film which is produced cheaply by melt blowing polyolefin resins which contain 25 to 60 wt % fillers selected from the fillers including an inorganic carbonate, synthetic carbonates, nepheline syenite, talc, magnesium hydroxide, aluminum trihydrate, diatomaceous earth, mica, natural or synthetic silicas and calcined clays or mixtures thereof, having a particle size less than 150 mesh.

A further aspect of the present invention is directed to polyolefin resins, especially polyethylene, which are chemically degradable by the incorporation of the combination of the above group of fillers and a metal carboxylate. The metal carboxylates of the present invention are inclusive of a large number of metals, such as cerium, cobalt, iron, and magnesium.

2 Claims, No Drawings

CHEMICALLY DEGRADABLE POLYOLEFIN FILMS

CROSS-REFERENCE TO RELATED APPLICATION

This application is a continuation application of U.S. patent application Ser. No. 08/104,195, filed Aug. 10, 1993, U.S. Pat. No. 5,416,133, entitled "CHEMICALLY DEGRADABLE POLYOLEFIN FILMS" which in turn is a continuation-in-part application of U.S. patent application Ser. No. 07/933,685, filed Aug. 24, 1992, entitled "CHEMICALLY DEGRADABLE/COMPOSTABLE PLASTICS", now abandoned.

FIELD OF THE INVENTION

The present invention is directed to polyolefin resins, especially polyethylene resins, which are loaded at high levels with certain fillers to produce cheap polyolefin melt blown film products. More specifically, film made from polyolefins having both a filler such as an inorganic carbonate and a metal carboxylate are rendered chemically and thermally degradable. In addition, the present invention is directed to chemically and thermally degradable cast film polyolefin products which contain these certain fillers and a metal carboxylate.

The fillers of the present invention are preferably calcium carbonates, magnesium carbonate or other inorganic carbonates including the synthetic carbonates but include materials such as nepheline syenite, talc, magnesium hydroxide, aluminum trihydrate, diatomaceous earth, mica, natural or synthetic silica and calcined clays.

BACKGROUND OF THE INVENTION

U.S. Pat. No. 4,156,666 discloses degradable polyolefin resin compositions comprising the polyolefin resin, about 0.2 to 10% by weight of a fatty acid or esters of fatty acids with monohydric aliphatic alcohols and optionally, about 10 to 60% by weight of an inorganic filler such as calcium carbonate. These resins are clearly characterized as molding resins and the acid or esters are promoters for photodegradability. The degradation of the molding resins disclosed requires exposure to sunlight for degradation to occur.

It is well documented that the first issue regarding degradable plastics is the definition of "degradable". The classification of environmentally degradable materials was made by R. Narayan of Michigan Biotechnology Institute in "Degradable Materials: Perspectives, Issues and Opportunities", pg. 1, CRC Press, 1990, as "biodegradable, photodegradable and chemically degradable." The question was posed: "Are they (degradable plastics) a delusion, a solution or a downright hoax?" in an article by John Donnelly, "Degradable Plastics", Garbage, May/June 1990. As described in the article, the first attempts at producing a degradable polyolefin film, trash bags for example, was to add materials such as starch or sugar which made the plastic more biodegradable or to add materials such as metals which made the plastic more photodegradable. However, each of these materials were dependant on the environment of the plastic; for example the presence of bacteria for the biodegradable reaction to occur or sunlight (UV) for the photodegradable reaction to occur.

The present invention is directed to a combination of additives which produce a chemical degradation of the plastic over a period of time. The compounding of the additives to the plastic resins permits the desired use, trash bag or agricultural film, but will by chemical reaction cause the plastic product to be environmentally degradable. This chemical reaction is accelerated by heat and/or UV light but will degrade without sunlight when heated to temperatures such as found when the plastic is buried in landfills.

SUMMARY OF THE INVENTION

The present invention is directed to melt blown polyolefin film which is produced cheaply by melt blowing polyolefin resins which contain 25 to 60 wt % fillers selected from the fillers including an inorganic carbonate, synthetic carbonates, nepheline syenite, talc, magnesium hydroxide, aluminum trihydrate, diatomaceous earth, mica, natural or synthetic silicas and calcined clays or mixtures thereof, having a particle size less than 150 mesh.

A further aspect of the present invention is directed to polyolefin resins, especially resins containing polyethylene, which are chemically degradable by the incorporation of the combination of the above group of fillers and a metal carboxylate. The metal carboxylates of the present invention are inclusive of a large number of metals, such as cerium, cobalt, iron, and magnesium.

BRIEF DESCRIPTION OF THE PREFERRED EMBODIMENTS

The present invention is directed to melt blowing polyolefin resins which contain 25 to 60 wt % of certain fillers. Heretofore, polyolefin resins used in melt blowing did not contain over 10 wt % of any filler since the fillers in most film grade resins would cause tearing or holes in the film. According to the present invention it was found that certain polyolefin resins can be used to produce melt blown film containing certain fillers at levels heretofore not thought possible. The fillers which can be used to fill a polyolefin resin are selected from the inorganic carbonate, synthetic carbonates, nepheline syenite, talc, magnesium hydroxide, aluminum trihydrate, diatomaceous earth, mica, natural or synthetic silicas and calcined clays or mixtures thereof, having a particle size less than 150 mesh. It was further found that these fillers needed to be free of water. The surface of these fillers are treated so as to not adsorb water which will produce steam and holes when melt blown into film. Accordingly, these fillers, such as calcium carbonate, are treated with organic acids to assist the processability of the carbonate and produce a more hydrophobic filler product. Acids such as stearic or oleic acid are conventional acids for surface treating the carbonates or other fillers. The surface treatment is usually done by the carbonate suppliers and a surface treated filler is part of the present invention.

The inorganic carbonates such as calcium carbonate or magnesium carbonate are preferred as fillers; however, lithium carbonate, sodium carbonate or sodium bicarbonate may also be used. In addition, the synthetic carbonates such as the hydrotalcite-like compound or the dihydroxyaluminium sodium carbonates may be used in the present invention. In addition to the inorganic or synthetic carbonates, a filler such as nepheline syenite, talc, magnesium hydroxide, aluminum trihydrate, diatomaceous earth, mica, natural or synthetic silicas including silicon dioxide and calcined clays or mixtures thereof, having a particle size less than 150 mesh may be used. All the fillers of the present invention have particle sizes less than 150 mesh but the smaller the particle site of the filler material, the more preferred it is as the filler material. The most preferred filler is calcium carbonate having a 1 to 10 micron particle size.

The polyolefins which are melt blown into film products according to the present invention include low density polyethylene (LDPE), linear low density polyethylene (LLDPE), polypropylene, polybutylene and copolymers of ethylene such as polyethylene-vinyl acetate (EVA), polyethylene-acrylic acid (EAA), polyethylene-methacrylic acid (EMA) or copolymers of ethylene or propylene with the lower olefins such as, butene-1, pentene-1, hexene or octene. The term "polyethylene resin" as used herein includes any resin where ethylene is predominant and is illustrated by the polyethylene resins in the foregoing list.

The polyolefin resins which are capable to be melt blown at filler levels of 15 to 65 wt %, preferably 20 to 55 wt %, have the characteristic that they are usually copolymers of ethylene or propylene. A common characteristic of the olefin resins used in the present invention are resins having high elongations (having an ultimate elongation {ASTM-D-638} of over 500%) and high melt strength which is usually associated with the property of high elongation. The copolymer resins usually have a significant amount (over 2 wt %, such as 2–25 wt %) of co-monomer and include the block copolymer resins. One group of polyolefin resins are those copolymers of ethylene which include acrylic acid, methaacrylic acid or vinyl acetate or monomers which have the characteristic of highly flexible thermoplastics. Another group of polyolefin resins are those which include ethylene or propylene and other olefins such as butene, hexene or octene as co-monomers to produce the copolymers. The term "polyolefin copolymer resin" as used herein includes those polyethylene or polypropylene resins which have at least one other co-monomer. The density of the polyethylene resins are between 0.70 and 0.97 and the molecular weights may range between 100,000 and 250,000. The melt index of these polyethylene resins may range from 20 to about 1 (gram/minute ASTM D 1238). The range of melt index is broad for applicable resins but it is not intended to infer that this broad range is applicable to each specific resin, but only that resins from that range of melt index when filled with the fillers of the present invention can be melt blown into film. These polyolefin resins used in the present invention are not resins which are necessarily produced and sold as film grade resins. However, when the high loading of the fillers of the present invention are incorporated into these polyolefin resins, the compounded resins are capable of being melt blown as a film.

Polyolefin resins that are injection molding resins or are unsuitable for the present invention are characterized as having small ultimate elongations, usually 100 to 300%, with no melt strength.

Melt blowing of polyolefins is a well known and established process for making polyolefin film; however, melt blowing films which contain 10 wt %, or more specifically greater than 20 wt % of a filler has not been done heretofore. Surprisingly, these high loadings of fillers is without detriment to the film blowing capabilities of the polyolefin resins of the present invention. In the melt blowing process, the polyolefin is extruded through a circular die having a gas, usually air, blown into the circle of resin to form a bubble which is pulled upward until the resin cools and the resin film is then run through rollers which collapse the bubble and forms a continuous cylinder of film. The apparatus for melt blowing film consists of an extruder, a circular die, an air ring for blowing air into the die, a collapsible frame for collapsing the bubble formed, nip rolls and a winder for the collapsed film. The film is then slit to form a sheet which usually is twice the size of the collapsed film (a cylinder of film) or in other words is about the size of the circumference of the bubble formed.

The present invention is further directed to chemically degradable polyolefin melt blown film. According to the present invention, melt blown polyolefin films are chemically degradable when a certain chemical prodegradant, specifically a metal carboxylate, is combined with the foregoing certain fillers. The degradable resins of the present invention are produced by incorporating the combination of certain fillers, which may be mixtures of fillers, and the chemical prodegradant, a metal carboxylate, to resins which are able to be melt blown into film and mixing the filler and prodegradant in an extruder and then forming the pellets which are used in the conventional melt blown film equipment. The term "degradable" as used herein means that the polyolefin exhibits more than loss of physical properties such as brittleness or lost of tensile strength but loss of molecular weight. The degradation of the polyolefin resins is clearly characterized as chemical since the degradation does not require UV light (photodegradable) or a bio initiator (biodegradable) for the degradation to be initiated and to take place. On the other hand, UV light (sunlight) will accelerate chemical degradation. Unique to the present invention is that the degradation additives, the combination of the fillers and the prodegradant, namely, the carbonate and metal carboxylate, will exceed 10 wt %, and can be greater than 20 wt %, and can be as high as 45 wt % or higher and formed into films of less than 1 to up to 25 mil or greater.

The prodegradant additives of the present invention which are combined with the fillers to produce the degradable products of the present invention are the metal carboxylates. The preferred metal carboxylates are cobalt, cerium and iron stearate. Other suitable mental carboxylates are carboxylates containing aluminum, antimony, barium, bismuth, cadmium, chromium, copper, gallium, lanthanum, lead, lithium, magnesium, mercury, molybdenum, nickel, potassium, rare earths, silver, sodium, strontium, tin, tungsten, vanadium, yttrium, zinc or zirconium.

A chemically degradable polyolefin film resin may be produced with as little as one weight percent (1 wt %) of each additive, 1 wt % of the selected carbonate fillers and 1 wt % of a metal carboxylate. However, it has been found that it is most desirable that the fillers of the present invention are added at high levels (10 wt % to 45 wt %) to the film producible polyolefin resins to produce a chemically degradable polyolefin film. The range of filler may be between 1 and 45 wt % and preferably between 5 and 25 wt % depending on the use of the film. For example, an agricultural film that requires the film integrity and the physical characteristics of the film for a short period of time will have a higher loading or greater weight percentage of filler than a film used in bags where the strength of the film may be required for a longer period of time.

The amount of metal carboxylate incorporated into the degradable film grade resins of the present invention is between 0.1 and 15 wt %, preferably between 0.5 and 3 wt %. Only a small amount of metal carboxylate may be required and amounts less than 1 wt % may be suitable, especially at very high loadings of fillers. The amount of metal carboxylate has a much greater effect on the rate of degradability than the amount of filler; however, one effect that the high loading of filler has is to reduce the total wt % of plastic present. Thus, the rate of degradability of the olefin plastic may be increased by increasing the amount of metal carboxylate or substantially increasing the amount of fillers. Another factor, however, is the environment of polyolefin film product which will accelerate the degradation process; hence, if the product is used outdoors and subjected to sunlight (UV), for example, the total degradation of the film product is accelerated. However, unlike compositions of the past, the prodegradant does not require UV light to initiate the degradation. Heat alone initiates the chemical degradation reaction, temperatures in excess of 100° F. and especially in excess of 120° F. will initiate the degradation especially in the presence of oxygen.

The degradable melt blown films of the present invention have uses in several different markets and depending on the market may contain additives which will have special application for that market. One market for use of the degradable films is as a landfill cover. Each night the open area or face, the area where trash has been dumped during operation, of the landfill requires a covering, which presently uses a six (6") inch covering of dirt, sand or other material. A significant advantage of the films of the present invention is that a reduction of 156 feet/year (6"×6 days×52 weeks) in the height of the landfill is possible. Since melt blown polyolefin films do not use a plasticizer or solvent, the film does not give off solvents or odors. Another advantage is that the film is chemically degradable under the conditions of compacting or multiple layers of trash placed in the landfill which raises the temperature to levels where the films of the present invention will degrade by a chemical/thermal reaction. The additives which are used in the landcover films are primarily color additives to provide a wide range of color choices. In addition, to overcome the usual bad odors of a landfill, an additive which provides a favorable smell can be added to the films of the present invention.

Another market for the degradable films of the present invention is agricultural films which conserves moisture and prevents weeds from growing, taking the nutrients from the growing crop. These polyolefin film covers provide protection from pests, wind and moisture loss; and cut down or eliminate the need for chemical sprays. The additives added to an agricultural film are in addition to color, nutrients such as trace elements and fertilizers. When the film degrades, these trace elements and fertilizers will aid the growth of the crop. Similar to the large scale agricultural market is the home garden market where the films of the present invention will contain the trace elements and fertilizers.

Still a further market is the conventional film markets; however, what is added to the film is the low cost and degradability features of the present invention. Such products as films for packaging, wraps, containers and disposables, especially disposable diapers and bags. In these applications, additional additives are not required but FDA approved materials may be added to modify properties.

As noted hereinabove, it is common practice that the commercial calcium carbonates will be surface treated with 1 wt % of an organic acid such as stearic acid or oleic acid before adding with the fillers to aid the processability of the carbonate but because the amounts are at most about 1 wt %, they are not separately accounted for in the formulations hereinafter.

The following examples, all formulations or recipes given in weight percent (wt %), illustrate some resins, the fillers and metal carboxylates used in the present invention:

EXAMPLE 1

60 wt % of a polyethylene—4% vinyl acetate (EVA) resin (PE 5272, a product of Chevron Chemical Company); and 40 wt % calcium carbonate ($CaCO_3$) are mixed and added to an extruder having a barrel temperature range of about 300°–425° F. and the strands pelletized to produce a film grade resin. This film grade resin is melt blown into a film of about 2 mil thickness and illustrates the melt blowing of a polyolefin resin with very high filling.

This example illustrates that very high loading of fillers in a polyolefin resin will produce a melt blown polyolefin film.

EXAMPLE 2

50 wt % polyethylene- vinyl acetate (EVA) copolymer (Elvax 260, a product of DuPont Chemical Company); and 50 wt % calcium carbonate are compounded, pelletized and blown into a 1 to 5 mil film.

The polyethylene (EVA) resin of this example has a density of 0.948 (ASTM D 1505), a melt index of 6 MI (ASTM 1238, modified). Even at the high loading level of 50 wt % of filler, a film is melt blown and surprisingly the line speeds can be increased since the film is easily cooled in that the fillers act as a heat sink. The addition of a filler which costs under $0.10/lb when added to resins which at their cheapest are about $0.30/lb and may be as much as $0.75/lb, illustrates the advantage of the present invention.

EXAMPLE 3

65 wt % polypropylene (HGZ 350, a product of Phillips Chemical company)

35 wt % calcium carbonate (Kodomite, a product of Thompson Weiman) are compounded, pelletized and cast into a 1 to 5 mil film.

It is clear that according to the present invention, film is produced from polyolefin resins having incorporated therein certain fillers, primarily polyethylene resins, to produce low cost film, especially suitable for disposable film products. Heretofore, the addition of additives to the melt blown polyolefins was solely the usual stabilizers, antiblock or carbon black or other coloring additives and were at low levels, usually less than 10 wt % and more normally less than 5 wt %. The levels of fillers selected from calcium carbonates, magnesium carbonate or other inorganic carbonates but which may include materials such as nepheline syenite, talc, magnesium hydroxide, mica, natural or synthetic silicas and calcined clays are between 10 to 60 wt % of the fillers and preferable between 15 to 50 wt %, with levels between 35 and 45 wt % of calcium carbonate easily producing a melt blown film. The fillers all have particle sizes less than 150 mesh and preferably sizes between 5 and 30 microns. The high loaded resins of the present invention may be melt blown into a 1 to 10 mil film.

The following Examples illustrate degradable films by the simple addition of a metal carboxylate. Other selected additives may be included in the specific films.

EXAMPLE 4

60 wt % of a polyethylene—4% vinyl acetate (EVA) resin (PE 5272, a product of Chevron Chemical Company);

39 wt % calcium carbonate ($CaCO_3$), acid coated; and 1 wt % cobalt stearate are mixed and added to an extruder having a barrel temperature range of about 300°–425° F. and the strands pelletized to produce a film grade resin. This example illustrates the combination of filler and a metal carboxylate. The compounded resin is melt blown into a degradable film.

This example illustrates a degradable resin for melt blowing agricultural film which after a short period of time under high temperature conditions will degrade.

EXAMPLE 5

55 wt % of a ethylene—octene copolymer (2045, a product of Dow Chemical Company);

40 wt % calcium carbonate ($CaCO_3$);

3 wt % cerium stearate; and 2 wt % carbon black is mixed and added to an extruder having a barrel temperature range of about 300°–425° F. and the strands pelletized to produce a film grade degradable resin. The compounded resin is melt blown into a degradable film.

The foregoing example illustrates the combination of the prodegradant, cerium stearate, a filler, a carbonate and other fillers such as carbon black which will color the film. The following example illustrates a formulation with a combination of fillers.

EXAMPLE 6

50 wt % of a ethylene-vinyl acetate (EVA) copolymer (ELVAX 350, a product of DuPont Chemical Company, 25 % VA and 19 MI);

33 wt % calcium carbonate ($CaCO_3$);

10 wt % talc;

5 wt % nepheline syenite (Minex 7, a product of Unimin Canada Limited)

2 wt % cobalt stearate is mixed and added to an extruder having a barrel temperature range of about 300°–425° F. and the strands pelletized to produce a film grade degradable resin. The compounded resin is melt blown into a degradable film.

The following examples include more than one metal carboxylate combined with the fillers.

EXAMPLE 7

60 wt % of a polyethylene—4% vinyl acetate (EVA) resin (PE 5272, a product of Chevron Chemical Company);

38 wt % calcium carbonate ($CaCO_3$);

1 wt % cerium stearate; and 1 wt % cobalt stearate is mixed and added to an extruder having a barrel temperature range of about 300°–425° F. and the strands pelletized to produce a film grade degradable resin. The compounded resin is melt blown into a degradable film.

EXAMPLE 8

50 wt % of a ethylene-hexene copolymer (VLLDPE 1539, a product of Union Carbide Company);

48 wt % calcium carbonate ($CaCO_3$);

1 wt % iron stearate; and 1 wt % cerium stearate is mixed and added to an extruder having a barrel temperature range of about 300°–425° F. and the strands pelletized to produce a film grade degradable resin. The compounded resin is melt blown into a degradable film.

The following example illustrates that more than one resin can be used to produce the degradable polyolefin resin of the present invention.

EXAMPLE 9

30 wt % of a ethylene-hexene copolymer (VLLDPE 1539, a product of Union Carbide Company);

30 wt % of a polyethylene—4% vinyl acetate (EVA) resin (PE 5272, a product of Chevron Chemical Company);

38 wt % calcium carbonate ($CaCO_3$);

1 wt % cobalt stearate; and 1 wt % iron stearate is mixed and added to an extruder having a barrel temperature range of about 300°–425° F. and the strands pelletized to produce a film grade degradable resin. The compounded resin is melt blown into a degradable film,.

This example illustrates the flexibility obtained by using two different resins to obtained desired film characteristics and two different prodegradants which have differing degradation rates.

EXAMPLE 10

30 wt % of a propylene-ethylene copolymer (HIMONT KS051, a Catalloy-process resin product of Himont, Inc.);

30 wt % of a polyethylene—4% vinyl acetate (EVA) resin (PE 5272, a product of Chevron Chemical Company);

37 wt % calcium carbonate ($CaCO_3$); and 3 wt % cobalt stearate is mixed and added to an extruder having a barrel temperature range of about 300°–425° F. and the strands pelletized to produce a film grade degradable resin. The compounded resin is melt blown into a 4 mil degradable film.

EXAMPLE 11

To the extruder of a melt blowing apparatus, the compounded resins of Example 10 is added together with equal amounts of the polyethylene—4% vinyl acetate (EVA) resin (PE 5272, a product of Chevron Chemical Company). The mixed resins thus have a 18.5 wt % of calcium carbonate and 1.5 wt % of the cobalt stearate. The compounded mixed resin is melt blown into 1 mil, 5 mil and 8 mil film.

EXAMPLE 12

The control resin is a linear low density polyethylene (LLDPE 7510, a product of Union Carbide).

A first sample is prepared:

57.5 wt % linear low density polyethylene (7510, a product of Union Carbide);

40 wt % calcium carbonate; and 2.5 wt % cobalt stearate are compounded, pelletized and blown into a 1 to 5 mil film.

A second sample is prepared:

55 wt % of a mixture of linear low density polyethylene and polypropylene (60 wt % LLDPE and 40 wt % PP);

40 wt % calcium carbonate;

2.5 wt % carbon black; and 2.5 wt % cobalt stearate are compounded, pelletized and blown into a 1 to 5 mil film.

Each sample is exposed to a UV lamp for 30 days. The molecular weight of the samples is found (source: LARKS ENTERPRISES of Webster, Mass.) as shown in Table 1:

TABLE 1

| SAMPLE | MOL. WT. NO. AVE. | MOL. WT. WT. AVE. | Dispersity |
|---|---|---|---|
| Control | 49490 | 242420 | 4.90 |
|  | 49502 | 242492 | 4.90 |
|  | 50293 | 243080 | 4.83 |
| Control ave | 49762 | 242664 | 4.88 |
| 1st | 2789 | 7920 | 2.84 |
|  | 2688 | 7741 | 2.88 |
|  | 2743 | 7859 | 2.87 |
| 1st ave | 2740 | 7840 | 2.86 |
| 2nd | 2192 | 4240 | 1.93 |
|  | 2121 | 4089 | 1.93 |
|  | 2067 | 4120 | 1.99 |
| 2nd ave | 2127 | 4150 | 1.95 |

From the foregoing data it is shown that the degradation of the polyolefins containing the combination of both a filler, calcium carbonate, and a metal carboxylate, cobalt stearate, degrade in the accelerated test to a waxy material. Thus, there is more than a reduction of molecular weight but a chemical degradation breaking the polymer into small molecules.

The same degradation is expected in the formulations in Examples 4–11, i.e., the samples will result in waxy material having melt indexes that are so high that they are difficult to measure.

Samples of films illustrated in Example 4–12 degrade when placed outside in about 1 to 2 weeks or 1 to 6 months depending on the specific levels of fillers or metal carboxylates and/or type of resin used. The samples also show degradation, loss of molecular weight and much greater melt indexes, by heating samples at temperatures of about 130° F. Clearly the degradation of the formulations of the present invention is chemical in nature and is initiated by either UV light or heat in the absence of sun light, typical of landfill conditions.

A specific application for the degradable resins of the present invention is agricultural film. Such film is used in agriculture as a cover to prevent weeds and other growth between the desired plants, such as onions, corn or tomatoes.

EXAMPLE 13

A formulation of Example 4 is melt blown as a 3–4 mil sheet and when placed outdoors degrades in about four to six weeks.

EXAMPLE 14

An agricultural film formulation similar to Example 4 is changed by adding small amounts, less than 1 wt % of trace metals such as manganese, copper, zinc, iron or nitrogen containing materials such as ammonium polyphosphate which when the film degrades enhances the soil or growing conditions of the desired plants.

EXAMPLE 15

Another agricultural mulch film formulation:

50 wt % polyethylene- vinyl acetate (EVA) copolymer (Elvax 470, a product of DuPont Chemical Company);

35 wt % calcium carbonate;

1.5 wt % cobalt stearate;

8.5 wt % ammonium polyphosphate; and 5 wt % trace elements (Mg, Cu, Zn, Fe).

EXAMPLE 16

The addition of polypropylene resin to the formulation with polyethylene enhances the degradation. A typical formulation containing polypropylene is:

53 wt % polyethylene—4% vinyl acetate (EVA) resin (PE 5272, a product of Chevron Chemical Company)

15 wt % polypropylene (HGZ 350, a product of Phillips Chemical company)

31.5 wt % calcium carbonate (Kodomite, a product of Thomson Weiman); and 0.5 wt % cobalt stearate.

The compounded resin is melt blown into a degradable film. The 1 to 5 mil film from this formulation degrades outside in about 1 to 6 weeks.

EXAMPLE 17

Formulations are prepared with other polyolefins as follows:

69 wt % polyolefin resin (the numbers in parenthesis { } are the ultimate elongations of the resin);

20 wt % calcium carbonate;

9 wt % nepheline syenite;

0.5 wt % cerium stearate;

0.5 wt % cobalt stearate;

1 wt % carbon black using the following polyolefins:

polyethylene-acrylic acid (EAA resin 435 {650%}; 452 {570%}; 455 {650%}; or 459 {650%}, products of Dow Chemical Company);

polyethylene-octene copolymers (ATTANE 4001 {1000%}; ATTANE 4002 {1000%}; or ATTANE 4003 {760%}, trademarks and products of Dow Chemical Company);

linear low density polyethylene (DOWLEX 2045 {1000%}, a product of Dow Chemical Company);

polyethylene-vinyl acetate (ELVAX 470 {750%}, trademark and products of DuPont Chemical Company)

polyethylene-methylacrylic acid (NUCREL 925 {520%}, trademark and products of DuPont Chemical Company)

polyethylene- 20% methyl acrylate (PE 2260 {800%}, a product of Chevron Chemical Company)

polyethylene-butene copolymer (LLDPE-7510 NATURAL {800%}, a product of Union Carbide).

polyethylene-hexene copolymer (VLLDPE-1539 {900%}, a product of Union Carbide).

This list of resins includes acidic resins such as the EAA resins, the ELVAX resins, the NUCREL resins and the methyl acrylate resins which when combined with the carbonates become degradable due to the reaction of the acid and the base to form carbon dioxide and water.

The invention is further illustrated by blown films of more conventional polyethylene film grade resins which are made degradable by the inclusion of the metal carboxylate.

EXAMPLE 18

91.75 wt % of a polyethylene resin (PE 5272, a product of Chevron Chemical Company);

7.5 wt % calcium carbonate ($CaCO_3$), acid coated; and 0.75 wt % cobalt stearate are mixed and added to an extruder having a barrel temperature range of about 300°–425° F. and the strands pelletized to produce a film grade resin. The compounded resin is melt blown into a degradable film. This example illustrates the combination of filler add a metal carboxylate.

EXAMPLE 19

91 wt % of a polyethylene resin (PE 5272, a product of Chevron Chemical Company);

7.5 wt % calcium carbonate ($CaCO_3$), acid coated; and 1.5 wt % cobalt stearate are mixed and added to an extruder having a barrel temperature range of about 300°–425° F. and the strands pelletized to produce a film grade resin. The compounded resin is melt blown into a degradable film. This example illustrates the combination of filler and a metal carboxylate.

All of the foregoing examples included polyolefins as part of the formulation which are melt blown into degradable films.

The present invention also includes a cast polyolefin film which is degradable. Heretofore, high loading of cast film resins have not been considered. However, it has been found that a cast film which is degradable by loading with the fillers and metal carboxylates of the present invention.

When the polyolefin resins or compounds are designed for cast film applications, the molecular weight distribution is critical. In order to extrude a smooth surface at high extrusion rates the molecular weight distribution must be narrow. Molecular weight distribution can be measured as a ratio of HLMI (ASTM 1238) to regular MI. The ratio of HLMI to MI when less than 6 indicates a narrow molecular weight distribution and such resins are used to produce the cast polyolefin films of the present invention.

The present invention of a degradable polyolefin film is illustrated by a formulation for a cast film.

EXAMPLE 20

37 wt % of a ethylene-hexene copolymer (VLLDPE 1539, a product of Union Carbide Company);

30 wt % polypropylene (HGZ 350, a product of Phillips Chemical Company);

30 wt % calcium carbonate;

2 wt % cerium stearate;

1 wt % titanium dioxide

This formulation is cast as a film.

The foregoing examples are illustrative of the present invention and the ranges and specific additives may be changed. The addition of additives in polyethylene resins may be as great as 60 wt %; whereas, with polypropylene resins the loading may be up to 50 wt %.

Some of the fillers, especially the synthetic silicas, can be tailored to have a refractive index which is essentially the same as the polyolefin resin or can be modified by the size of the particle to make the refractive index the same as the resin. When the refractive index of the filler and the resin is the same a clear film is produced. Some of the prodegradants such as cerium stearate are also clear which permits the first clear degradable film to be produced.

We claim:

1. A polyolefin film produced from the process for melt blowing a degradable polyolefin resin into a film comprising:

extruding a polyethylene composition consisting essentially of 50 to 92wt % polyethylene resin; 47 to 7.5 wt % a filler selected from the group consisting of inorganic carbonates, synthetic carbonates, talc, magnesium hydroxide, mica, natural silicas, synthetic silicas and calcined clays, having a particle size less than 150 mesh; and 3 to 0.5 wt % metal carboxylate through a melt blowing die;

blowing a bubble of said composition; and collapsing said bubble into a film.

2. A polyolefin film produced from the process according to claim 1 wherein said polyethylene composition consists essentially of:

at least 50 wt % and up to 92 wt % polyethylene resin;

47 to 7.5 wt % filler; and 3 to 0.5 wt % metal carboxylate.

* * * * *